Feb. 27, 1968     J. CHOLET ET AL     3,371,311

TOWED PRESSURE TRANSDUCERS WITH VIBRATION ISOLATION

Filed May 23, 1966     5 Sheets-Sheet 1

INVENTORS
Jacques Cholet
Michel Dubesset &
Michel Lavergne

BY *Spencer & Kaye*

ATTORNEYS

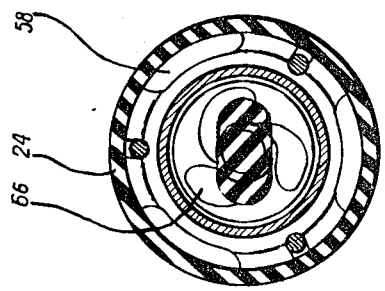
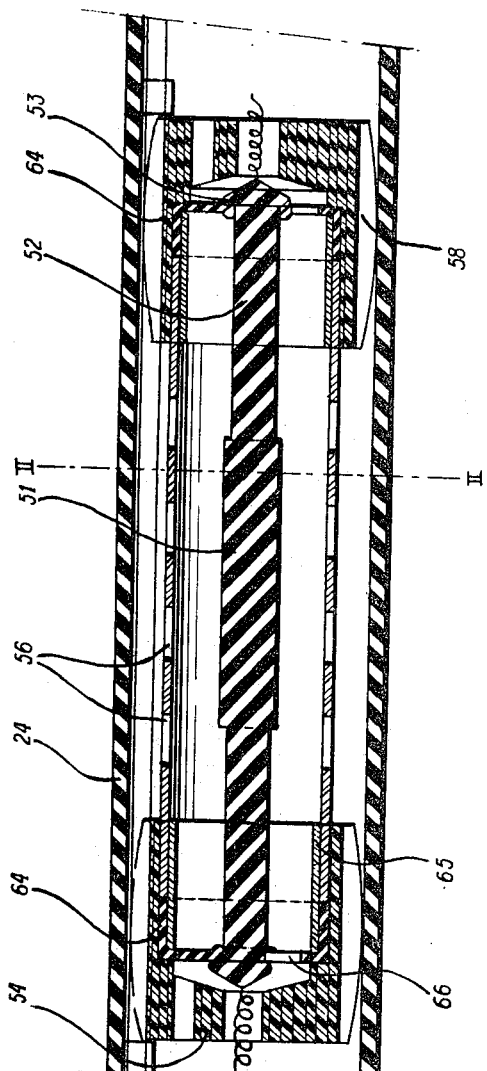

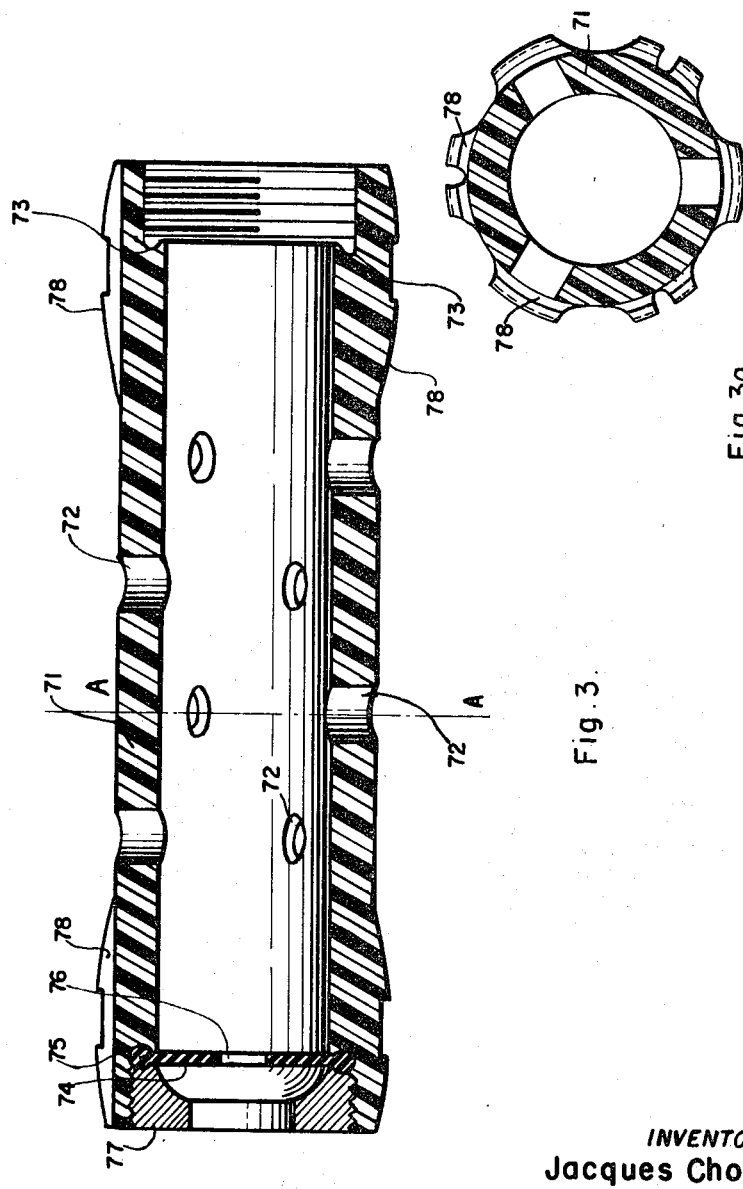

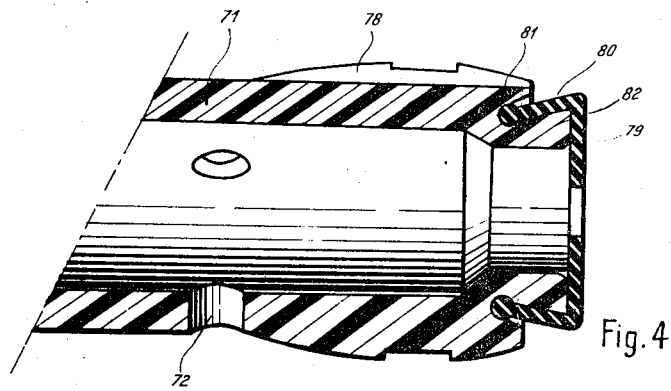
Fig. 4
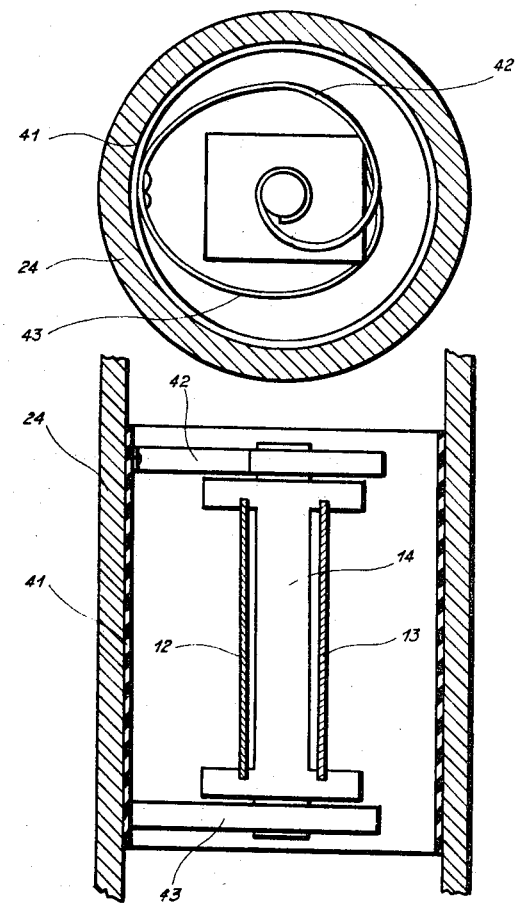
Fig. 5A
Fig. 5
INVENTORS
Jacques Cholet
Michel Dubesset &
Michel Lavergne
BY Spencer & Kaye
ATTORNEYS

United States Patent Office 3,371,311
Patented Feb. 27, 1968

3,371,311
TOWED PRESSURE TRANSDUCERS WITH VIBRATION ISOLATION
Jacques Cholet, Rueil-Malmaison, Michel Dubesset, Clermont-Ferrand, and Michel Lavergne, Le Vesinet, France, assignors to Institut Francais du Petrole, des Carburants et Lubrifiants, Rueil-Malmaison, France
Filed May 23, 1966, Ser. No. 552,165
Claims priority, application France, May 22, 1965, 18,075; Dec. 14, 1965, 42,280; Dec. 30, 1965, 44,440
11 Claims. (Cl. 340—17)

ABSTRACT OF THE DISCLOSURE

Apparatus for use in seismic prospecting and including towing means in the form of a deformable tube, at least one pressure sensor, and connecting means forming a vibration insulating connection between the sensor and the towing means, the connecting means essentially including a sheath of deformable material enclosing the sensor, two elastic arms connected to respective ends of the sheath, a rigid perforated cage surrounding the sheath, and elastic support means supporting the free ends of the arms and the ends of the cage and tightly inserted in the deformable tube constituting the towing means.

---

The present invention relates to the field of seismic prospecting, and particularly to pressure transducers for submarine seismic prospecting.

In underwater seismic prospecting, it is generally necessary to obtain signals representing pressure variations artificially induced in the water by various excitation sources. For this purpose, it is often the practice to employ pressure transducers, or sensors, such as hydrophones, which are maintained underwater and which are disposed at various distances from the excitation source.

Known types of pressure sensors often present the inconvenience of being sensitive to parasitic noises, in particular to acceleration noises and to eddy current noises. For example, hydrophones utilized for seismic prospecting at sea generally present this inconvenience. Even when the receiving device is theoretically immobile in the water, the hydrophone is constantly subjected to various movements, due for example, to ocean swells and currents. When the receiving device is towed behind a ship, the accelerations due to eddy currents and to traction effects are even greater and create at the hydrophones a parasitic electric signal which is liable to mask the pressure signal.

It is an object of the present invention to provide pressure sensors whose sensitivity to noises is considerably diminished and whose sensitivity to pressure is augmented.

A more specific object of the present invention is to mechanically isolate such pressure sensors from extraneous pressure variations.

Another specific object of the present invention is to produce an electrical cancellation of such extraneous pressure variations.

A further object of the present invention is to provide a simple structure capable of producing the above results.

The present invention has as a further essential object to render pressure sensors, and particularly hydrophones, practically insensitive to acceleration noises. A particularly advantageous result thereof will be a considerable improvement in the signal to noise ratio of the pressure signals recorded during marine seismic prospecting.

The pressure sensors according to the present invention are rendered practically insensitive to acceleration and vibration noises, on the one hand, by mechanically isolating the hydrophones from the surrounding environment, which permits a considerable reduction of the accelerations to which they are subjected and, on the other hand, by substantially completely annulling the residual acceleration effects by an electrical compensation system employing at least two pressure sensitive elements disposed in such a manner that the pressure acts on them in opposite direction, i.e., in phase opposition, while the acceleration effects act on them in the same direction, i.e., in phase coincidence. The electric outputs from these elements are connected together in such a manner that the true pressure signals are retained, and even enhanced while the acceleration and vibration signals cancel each other out. If the two elements are substantially identical, the acceleration signals will tend to annul one another.

These and other objects and features of the present invention are obtained by the provision of apparatus for use in underwater seismic prospecting, which apparatus primarily includes entrainment or towing means arranged to be towed in the water, at least one pressure sensor, and elastic connecting means forming an elastic vibration insulating connection between the at least one sensor and the towing means. In further accordance with the present invention, the elastic connecting means include elastic suspension means carrying the at least one sensor, and elastic supports supporting the suspension means and firmly attached to the towing means.

According to one specific embodiment of the present invention, the elastic connecting means is constituted by a sheath of deformable material, one for each sensor, each sheath enclosing a respective one of the sensors and forming a unit with the elastic suspension means, the elastic connecting means further including elastic supports supporting the suspension means and provided with means for attaching the towing means, and a rigid cage for protecting the sensor, this cage being disposed around the sheath and being provided with openings for the passage of a fluid enclosed within the towing means.

According to another embodiment of the present invention, the elastic connecting means are constituted by spiral leaf springs each having one end connected to a sensor and the other end connected to the towing means.

According to a further feature of the present invention, there are provided two pressure sensitive elements in the form of hollow cylinders, and mounting means supporting the cylinders and permitting the liquid contained in the towing means to act only on the outer wall of one of the elements and the inner wall of the other of the elements. In this form of construction, conductor means are also provided for electrically connecting the two sensing elements together.

Additional objects and advantages of the present invention will become apparent upon consideration of the following description when taken in conjunction with the accompanying drawings in which:

FIGURE 2 is a longitudinal cross-sectional view of a first variation of the suspension system of FIGURE 1.

FIGURE 2a is a cross-sectional view along the line II—II of FIGURE 2.

FIGURE 3 is a longitudinal, cross-sectional view of a second variation of the suspension arrangement of FIGURE 1.

FIGURE 3a is a cross-sectional view taken along the line A—A of FIGURE 3.

FIGURE 4 is a longitudinal, cross-sectional, partial view of a third variation of the suspension arrangement of FIGURE 1.

FIGURE 5 is a longitudinal, cross-sectional, partial view of another embodiment of the present invention.

FIGURE 5a is an end cross-sectional view of the arrangement of FIGURE 5.

Figure 1A:
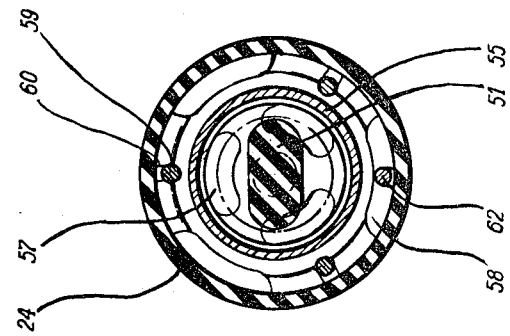
FIGURE 1a is a cross-sectional view taken along the line I—I of FIGURE 1.
Figure 1:
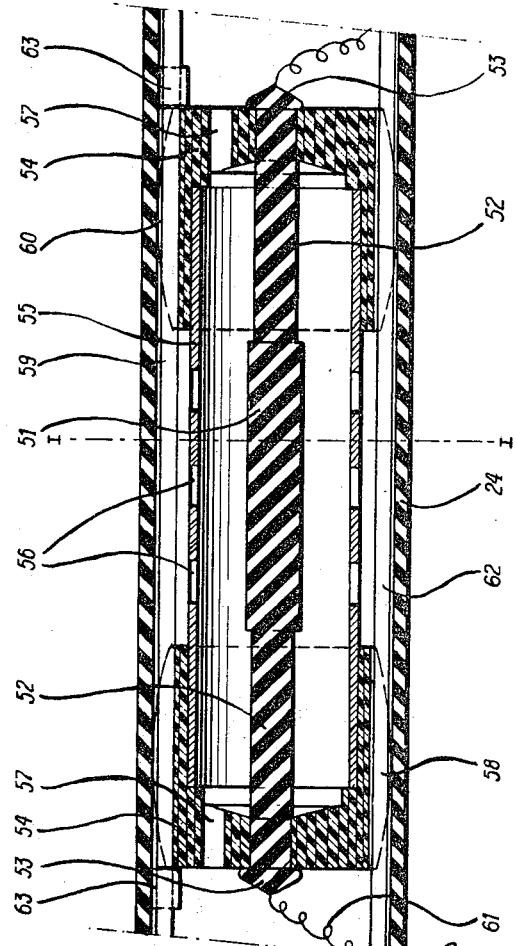
FIGURE 1 is a longitudinal cross-sectional view of a first suspension system for a pressure sensor according to the present invention.

According to a first embodiment of the elastic suspension shown in FIGURES 1 and 1a, the pressure sensor which may be any suitable type of mechanical, pneumatic or electrical pressure transducer, is molded into a sheath 51 made of an impermeable, elastic material such as rubber, for example, provided with two suspension arms 52 made of the same material, the length of these arms being chosen in dependence on the mass of the sensor in such a manner that the resonant frequency of the assembly will be of the order of 5 c.p.s., for example.

The pressure sensor may be of any conventional type. By way of example, there may be placed in the sheath pressure sensors of the type described in U.S.P. 3,178,681 or in U.S.P. 2,126,436.

The ends of arms 52 terminate in heads 53 and are each engaged in an axial orifice formed in the end base of a respective sleeve 54 so that each head 53 abuts against the outer end face of its associated sleeve 54 and thus prevents any longitudinal movement between the sleeve and sheath 51. The outer cylindrical surface of each sleeve 54, which has a circular cross section is provided with circumferentially distributed bosses which serve to enlarge the maximum diameter of sleeve 54 by an amount sufficient to cause the sleeve to fit tightly in towing tube 24. The sleeve is further provided at the side opposite to its outer end face with a cavity in which is engaged a rigid cylindrical cage 55 perforated with fluid passage orifices 56, the exterior diameter of this cage being chosen to conform with the interior diameter of the cavities in sleeves 54. These sleeves are also provided with channels 57 which are formed non-axially in their end bases, and with longitudinal grooves 58 and 60 arranged in their exterior lateral wall. The abutting heads 53 and rigid cage 55 act to maintain the assembly of sleeves 54, sheath 51 and cage 55 in proper assembled relationship.

The sleeves 54 are made of a material, such as rubber or plastic, for example, which is sufficiently resistant to possible shocks, and yet which is sufficiently elastic to efficiently isolate the sensor from vibrations or accelerations in the towing system.

The assembly is placed in a towing tube 24 made of a supple or deformable material which is also preferably elastic, which assures the transmission of seismic waves to the sensors through the intermediary of a fluid, for example oil, contained in this tube. The perforations 56 in the cage 55, and the perforations 57 in the ends of sleeves 54 permit the passage of the oil in such a manner that it will completely surround the sheathed sensor 51. Traction and spacing cables 59, which are placed between the interior wall of tube 24 and the exterior wall of cage 55, are force fitted into the passages 60 arranged longitudinally in the exterior lateral surfaces of sleeves 54, the cross sections of these passages being smaller than those of the cables 59, in such a manner that the latter are gripped by the elastic material of the sleeves.

The connecting wires 61 of the sensor are housed in the suspension arms 52 and emerge through the heads 53, thus not impeding movement of the sensor. The electric wires 61 are carried on the main cable 62 which collects the various conductor wires of all of the sensors mounted in the tube 24.

During assembly, the sensor and its suspension elements can first be mounted outside of tube 24 directly at the position chosen on the cables 29 and maintained at this position by the collars 63 crimped on these cables, and serving as abutments for the end faces of sleeves 54. One can attach in this manner several pressure sensors along the traction cables. It is then sufficient to slide the assembled arrangements into the deformable tube 24, which is rigidly connected to a towing device.

A variation of the suspension device described above is illustrated in FIGURES 2 and 2a.

According to this variation, the extremeties of the suspension arms 52 of the sensor sheath 51 are each engaged in the axial orifice of the end face of a respective one of the intermediate supports 64 which are made of an elastic material and which have the form of lids provided with cylindrical lateral walls. Orifices 66 arranged in these end faces permit the passage of oil into the region around sheath 51. The supports 64, which are of the same diameter as cage 55, are each fitted over a tube 65 attached at the interior of the ends of this cage, and are maintained in position by the heads 53 which thus constitute abutments. This arrangement causes supports 64 to seat properly in the cavities of sleeves 54.

The supports 64 are made of a material whose elasticity is such that the resonant frequency of the assembly constituted by the pieces 51 and 52, along the axis of the system, is low, for example of the order of 5 c.p.s.

The mounting of the assembly in the tube 24 is carried out in an identical manner to that of the arrangement of FIGURES 1 and 1a.

Referring to FIGURES 3 and 3a, which illustrate a second variation of the elastic suspension system of FIGURE 1, a tube element 71 made of a rigid material, of polyethylene for example, having a specific gravity of less than unity, is pierced with lateral holes 72. A shoulder 73 having the form of an annular groove is formed in the interior wall of tube 71 near each end thereof in such a manner as to support a circular elastic membrane 74 whose periphery is provided with a substantially toroidal bead 75 seated in the groove. Each membrane 74, which is provided with a central hole 76, is maintained in position in a respective one of the collars 77 (one only illustrated) which is screwed into a respective end of the tube 71. A sheathed pressure sensor (not shown) which is identical with that shown in FIGURES 1 and 2, is suspended in a manner similar to that illustrated in FIGURE 2, by two elastic arms, the end of each of which is engaged in the hole 76 of a respective membrane 74. The assembly is designed to be slid into an elastic, impermeable envelope similar to the envelope 24 of FIGURE 2. At each extremity of the plastic tube 71, its outer wall is provided with bosses 78 distributed around its periphery in such a manner as to leave between them passages for the various electrical conductors and the oil in which the system is to be bathed, as is best seen in FIGURE 3a. The exterior diameter of the arrangement constituted by the tube and the bosses is substantially equal to the interior diameter of the impermeable tube into which it is to be inserted.

The tube 71 and its bosses 78 being molded as a single piece, the structural simplicity of this hydrophone suspension is evident.

According to another variation of this embodiment, illustrated in FIGURE 4, the ends of tube 71 are structurally simplified. They no longer include either the shoulders 73 in the form of annular grooves, the collars 77 or the screw threads required for holding these collars in position.

In place thereof, there is employed a rubber membrane 79 having a frustoconic peripheral portion 80 whose end is furnished with a substantially toroidal bead 81. The frustoconic portion 80 of this membrane is force-fitted, this being possible because of the elasticity of the rubber, over a housing 82 having a suitable form. The membrane 79 is maintained in place by its elasticity and by the tension applied to the rubber due to its being stretched over housing 82.

The mounting thus provided evidently constitutes a particularly simple embodiment.

FIGURES 5 and 5a represent an elastic suspension system for a sensor of the type having single diaphragm sensing elements. A sensor carrying two single diaphragm sensing elements 12 and 13 disposed to respective opposite sides of a support 14 is connected to a rigid tube 41 by spiral leaf springs or other elastic systems 42 and 43 which are properly chosen so that the resonant frequency of the assembly which they form with the support 14 will be sufficiently low, 5 c.p.s. for example, to assure that the components of parasitic movements will be highly attenuated in the useful frequency band (10 to 350 c.p.s. for example). Oil, or a liquid chosen for transmitting the pressure, fills the space between tube 41 and support 14 in such a manner that the pressures will be transmitted to the two sensing elements 12 and 13 of the sensor without substantial attenuation. The tube 41 is rigidly connected to a towing device and disposed for example, but not necessarily, on the interior of a long rubber tube 24 having a suitable buoyancy and offering good towing qualities.

The tube 24 may contain a large number of hydrophones each similarly mechanically isolated from the tube 41, and, as a result, from the tube 24.

Owing to the elastic connection systems according to the present invention, and to the liquid chosen for transmitting the pressures, the hydrophones are highly sensitive to pressures and relatively insensitive to accelerations or vibrations in the frequency band of interest.

In order to substantially annul the effects of residual accelerations and vibrations, an electrical compensation is effectuated by utilizing at least two pressure sensitive elements disposed in such a manner that the pressure acts on them in opposite senses, i.e., in phase opposition, while the acceleration acts on them in the same sense, i.e., in phase coincidence.

Figure 6:
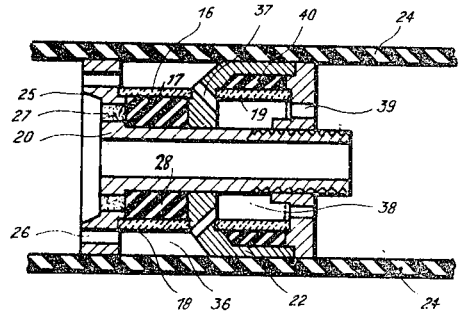
FIGURE 6 is a longitudinal, cross-sectional view of one embodiment of a pressure sensor according to the invention comprising two piezoelectric elements in the form of hollow cylinders.
Figure 6A:
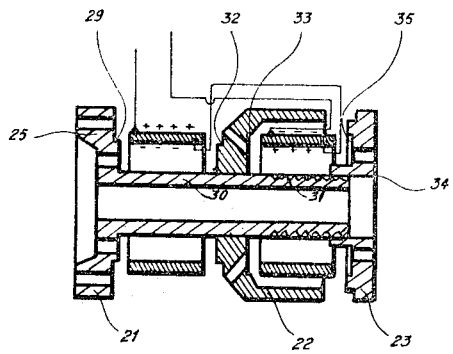
FIGURE 6a is a schematic, exploded view of the arrangement of FIGURE 6 showing the different associated parts and the electrical connections of the piezoelectric elements.

One embodiment according to the present invention of such an electrical compensation system is illustrated in FIGURES 6 and 6a.

In this embodiment, the sensing elements are constituted by hollow cylinders or tubes 16 and of radially polarized piezoelectric ceramic. A constraint exerted from the exterior towards the interior of the tubes creates a compression between their internal face 17 and their external face 18.

FIGURE 6 illustrates the coupling of two identical piezoelectric tubes 16 and 19 on a rigid support 20 in such a manner that the pressure to be sensed is exerted on the exterior surface of tube 16 and on the interior surface of tube 19, so that, by placing their electric outputs in parallel by connection of the external face of tube 16 to the internal face of tube 19 and connection of the internal face of tube 16 to the external face of tube 19, or in series by connection of the external face of tube 16 to the external face of tube 19, or by connection of the internal faces of the two tubes (FIGURE 6a shows a connection in series), the pressure signals, which correspond to the deformations of the tubes 16 and 19 in respective opposite directions, are added while the signals due to identical deformations of the two tubes 16 and 19 as due to accelerations or vibrations, are suppressed or completely canceled.

FIGURES 6 and 6a show a particularly simple embodiment of such a coupling of two tubular piezoelectric ceramics in which the support 20 is made up of three pieces 21, 22 and 23.

These pieces are constructed in such a manner as to solidly hold the tubular ceramics 16 and 19 and so as to only submit one side of each of them to the pressure to be sensed, i.e., the exterior side of tube 16 and the interior side of tube 19.

The sensor constituted by the assembly of two tubular ceramics and of the support is designed, in the embodiment envisioned, to be housed in a tube 24 (FIGURE 6) made of a supple or deformable material, which is also preferably elastic, which assures the communication of the exterior pressure to the fluid contained within the tube. This embodiment permits, by placing a body of oil within the tube, an elimination of all contact between the sensing elements and the exterior water.

In order to fasten the sensor to the tube, the largest exterior diameters of the pieces 21, 22 and 23 will be substantially equal to the interior diameter of the tube 24 where the sensor will be housed, support 20 preferably being forced fitted in tube 24.

The piece 21 has a circular base 25 furnished with orifices 26 intended for the passage of fluid contained in the tube 24 and with orifices 27 permitting the introduction into the annular cavity 28 (FIGURE 6) of a material having, after solidification, elastic properties, such as natural or synthetic rubber for example.

The base 25 of piece 21 is also furnished with a circular shoulder 29 having a diameter equal, to close tolerances, to the interior diameter of the tubular piezoelectric element 16. In its central portion, the base 25 is prolonged by a tubular part 30 whose extremity is provided with a threading 31. This tubular part is intended to pass through the central orifice of the piece 22 having the form of a cup, i.e., its cross section taken along a plane through its axis has the form of a U. The exterior diameter of the piece 22, in the region of the arms of the above-mentioned U, is equal to the exterior diameter of the base 25 of piece 21.

The base of piece 22 is furnished with a circular shoulder 32 having the same diameter as the shoulder 29 and coaxial with the central orifice through which passes the tubular part 30 of the piece 21. The base of piece 22 is also furnished with an interior shoulder 33 which is also coaxial with the central orifice in piece 22 and which has a diameter equal, to close tolerances, to the exterior diameter of the tubular piezoelectric element 19. Element 19 is identical with element 16.

Finally, the piece 23, whose exterior diameter is equal to that of the base 25 of piece 21, is provided with a central orifice 34 which is internally tapped so as to be screwed on the external threading 31 of the tubular part 30 of piece 21. Piece 23 is also provided with a circular interior shoulder 35 which is coaxial with orifice 34 and which has the same diameter as the shoulder 33 of piece 22.

The mounting of the sensors is effectuated very simply by placing the element 16 between pieces 21 and 22, the latter being brought toward each other in such a manner as to hold the elements 16 between the circular shoulders 29 and 32. Then the element 19 is placed in the circular shoulder 33, and finally the piece 23 is screwed into place in such a manner as to hold the element 19 between shoulders 33 and 35.

As is shown in FIGURE 6, this assembly forms in cooperation with the tube 24, an annular chamber 36 around the sensing element 16, which chamber communicates with the remainder of the tube via the orifices 26.

There are also provided, in the piece 22, orifices 37 which place the annular chamber 36 in communication with the annular chamber 38 created in the space between element 19 and the tubular part 30 of piece 21. Orifices 39 are also provided in the piece 23 so as to assure a free communication between the annular chamber 38 and the rest of tube 24.

Owing to these orifices, the pressure which is exerted on the interior face of element 19 is always equal to that which is exerted on the exterior face of element 16. The annular space 40 surrounding element 19 and enclosed by the piece 22 is filled with an elastic material which is preferably of the same nature as that contained in the annular space 28.

Of course, the invention is not limited to the embodiments illustrated by way of example in the attached drawings, but includes all devices in which there are associated at least two piezoelectric elements having a cylindrical form in such a manner that their deformations, under the effects of pressure, will be in opposite directions, while their deformations due to accelerations or vibrations will be in the same direction.

The sensors according to the present invention are, moreover, to a great extent removed from the effects of accelerations and vibrations by being mechanically isolated from the towing system (deformable tube 24), by an elastic suspension of the type described above.

Figure 7:
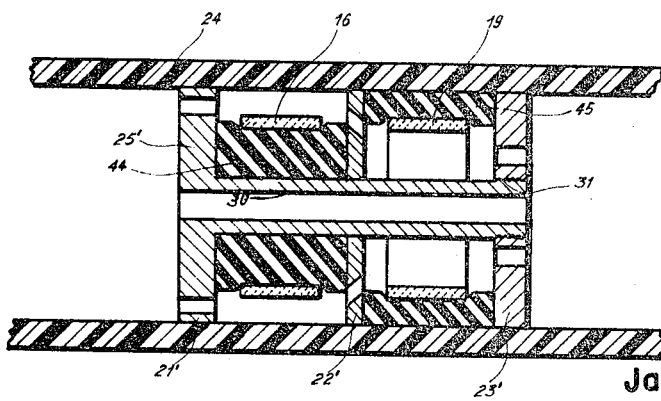
FIGURE 7 is a longitudinal, cross-sectional view of a modified version of the arrangement of FIGURE 6.

FIGURE 7 shows an embodiment of an elastic connection system according to the present invention applied to a sensor comprising two tubular piezoelectric ceramics 16 and 19.

The assembly thus produced may be compared with that shown in FIGURES 6 and 6a and the same reference numerals are used for designating the same elements. However, this time the two ceramic tubes 16 and 19 are not subjected to any compression along the axis of the tubular part 30 of the piece 21' when the piece 23' is screwed onto the threaded extremity 31 of this tubular part.

In the embodiment illustrated in FIGURE 7, the tubular ceramic 16 surrounds a tube 44 made of a compressible material such as rubber, and having an exterior diameter which is, in the absence of any axial compression, substantially equal to the interior diameter of the tube 16, the length of tube 44 being greater than that of the ceramic.

The tubular ceramic 19 is engaged in the interior of a tube 45 made of a compressible material such as rubber, and having a length which is greater than that of this ceramic and an internal diameter which is substantially equal to the exterior diameter of this ceramic 19, in the absence of any axial compression of the tube 45.

At the time that the piece 23' is screwed onto the threaded extremity 31 of tubular part 30 of piece 21', the two tubes 44 and 45 are compressed, in a direction parallel to their axes, between the base 25' of piece 21' and the pieces 22' and 23'. The result of this compression is a slight radial swelling of each of the tubes 44 and 45 and so as to give them the form shown. As may be clearly seen, this slight swelling serves to create a solid holding of the tubular ceramics 16 and 19.

The tubes of compressible material 44 and 45 being longer than their associated ceramics 16 and 19, the latter will not be compressed axially between the piece 22' and the base 25' of piece 21' or the piece 23' at the time of the screwing on of the latter.

Since the piezoelectric tubes 16 and 19 are not in direct contact with the pieces 21', 22' or 23', but are separated from the latter by compressible tubes 44 and 45, respectively, it results that these ceramic tubes will be substantially insensitive to vibrations transmitted by the towing tube 24 to the housing constituted by pieces 21', 22' and 23'.

It will be understood that the above description of the present invention is susceptible to various modifications, changes and adaptations, and the same are intended to be comprehended within the meaning and range of equivalents of the appended claims.

What is claimed is:

1. Apparatus for use in underwater seismic prospecting comprising, in combination:
    (a) a towing tube made of a deformable material and enclosing a liquid;
    (b) at least one pressure sensor composed of two pressure sensitive elements in the form of hollow cylinders, and electrical connecting means connecting said sensitive elements together; and
    (c) connecting means supporting said sensitive elements in said tube for causing the liquid contained in said tube to act only on the outer cylindrical surface of one of said elements and the inner cylindrical surface of the other of said elements.

2. An arrangement as defined in claim 1 wherein said connecting means comprises rigid supports supporting the ends of each said cylinder and tightly inserted in said towing tube.

3. An arrangement as defined in claim 1 wherein said connecting means comprises elastic suspension means supporting that wall of each said sensitive element which is opposite to that wall on which said liquid acts.

4. Apparatus for use in underwater seismic prospecting comprising in combination:
    (a) towing means constituted by a tube of deformable material enclosing a liquid;
    (b) at least one pressure sensor; and
    (c) connecting means forming a vibration insulating connection between said sensor and said towing means, said connecting means including at least one sheath of deformable material enclosing said sensor, elastic suspension means constituted by two arms for carrying said sheath, each of said arms having one end connected to a respective end of said sheath and having its other end provided with a head, elastic support means supporting said suspension means and constituted by two sleeves for each said sheath, a rigid tubular protecting cage for protecting said sensor, said cage being disposed around said sheath and being provided with openings, each of said sleeves being made of an elastic material and being provided with an axially disposed cylindrical cavity into which one end of its associated cage is fitted, each said sleeve further having an end wall provided with a central orifice through which passes the free end of a respective one of said arms, thereby to connect said sleeves to said sheath, and means for connecting said support means to said towing means.

5. An arrangement as defined in claim 4 wherein said means for connecting said sleeves to said towing means are constituted by bosses extending radially outwardly from the exterior lateral walls of said sleeves, the arrangement of said bosses and their associated sleeves having a maximum outer diameter which is substantially equal to the interior diameter of said tube constituting said towing means.

6. Apparatus for use in underwater seismic prospecting comprising, in combination:
    (a) towing means constituted by a tube of deformable material enclosing a liquid;
    (b) at least one pressure sensor; and
    (c) connecting means forming a vibration insulating connection between said sensor and said towing means, said connecting means including at least one sheath of deformable material enclosing said sensor, elastic suspension means constituted by two arms for carrying said sheath, each of said arms having one end connected to a respective end of said sheath and having its other end provided with a head, elastic support means supporting said suspension means and constituted by two sleeves for each said sheath, a rigid tubular protecting cage for protecting said sensor, said cage being disposed around said sheath and being provided with openings, each of said sleeves being made of an elastic material and being provided with an axially disposed cylindrical cavity into which one end of its associated cage is fitted, said support means further include a pair of intermediate supports being in the form of a lid having a cylindrical lateral wall and a flat end wall provided with at least one axial passage, each said intermediate support being seated securely in the bottom of said cavity of a respective one of said sleeves, each said arm associated with the same sheath passing through said opening in the end wall of a respective one of said intermediate supports, thereby to connect said intermediate support to said sheath, and means for connecting said support means to said towing means.

7. An arrangement as defined in claim 6 wherein said means for connecting said support means to said towing means are constituted by bosses extending radially outwardly from the exterior lateral walls of said sleeves, the arrangement of said bosses and their associated sleeves having a maximum outer diameter which is substantially equal to the interior diameter of said tube constituting said towing means.

8. Apparatus for use in underwater seismic prospecting comprising, in combination:
 (a) towing means constituted by a tube of deformable material enclosing a liquid;
 (b) at least one pressure sensor, and
 (c) connecting means forming a vibration insulating connection between said sensor and said towing means, said connecting means including at least one sheath of deformable material enclosing said sensor, elastic suspension means constituted by two arms for carrying said sheath, each of said arms having one end connected to a respective end of said sheath and having its other end provided with a head, two circular membranes, each said membrane having a peripheral, toroidal bead and an axial opening, said other end of each said arm extending through said opening in a respective one of said membranes for connecting said sheath to said membranes, a rigid tubular protecting cage for protecting said sensor, said cage being disposed around said sheath and being provided with openings, each end of said cage being provided with an annular groove in which the bead of a respective one of said membranes is seated, and means for connecting said cage to said towing means.

9. An arrangement as defined in claim 8 wherein means for connecting said cage to said towing means are constituted by bosses extending radially outwardly from the exterior lateral walls of said cage, the arrangement of said bosses and the associated cage having a maximum outer diameter which is substantially equal to the interior diameter of said tube constituting said towing means.

10. An arrangement as defined in claim 9 wherein the inner wall at each end of said cage is provided with an internal shoulder in which said groove is disposed, and said support means further comprise a pair of annular collars for each said cage, each said collar engaging in a respective end of said cage and holding a respective one of said membranes firmly in position in its said groove.

11. An arrangement as defined in claim 9 wherein each said membrane is provided with a frustoconic edge portion which tapers inwardly toward said bead, and each end of said cage is provided with a frustoconic projection adjacent a respective one of said grooves and matching said frustoconic portion of a respective one of said membranes, each said membrane having its said frustoconic portion fitting tightly over said respective projection of said cage.

References Cited
UNITED STATES PATENTS 3,065,456 11/1962 Alexander _____ 340—17
3,281,768 10/1966 Pavey et al. _____ 340—7

RODNEY D. BENNETT, *Primary Examiner.*

BENJAMIN A. BORCHELT, *Examiner.*

P. A. SHANLEY, D. C. KAUFMAN,
*Assistant Examiners.*